United States Patent [19]
Diaz

[11] Patent Number: 4,508,693
[45] Date of Patent: Apr. 2, 1985

[54] SOLUTION REMOVAL OF HCN FROM GASEOUS STREAMS, WITH PH ADJUSTMENT OF REACTED SOLUTION AND HYDROLYSIS OF THIOCYANATE FORMED

[76] Inventor: Zaida Diaz, Houston, Tex.

[21] Appl. No.: 556,257

[22] Filed: Nov. 29, 1983

[*] Notice: The portion of this patent subsequent to Feb. 5, 2002, has been disclaimed.

[51] Int. Cl.$^3$ .................... C01C 3/00; C01B 17/16; C01B 17/02
[52] U.S. Cl. .................... 423/236; 423/237; 423/355; 423/366; 423/437; 423/563; 423/567 R; 423/567 A; 423/571
[58] Field of Search .......... 423/236, 237, 563, 567 A, 423/567 R, 571, 355, 366, 437

[56] References Cited
U.S. PATENT DOCUMENTS

| | | | |
|---|---|---|---|
| 1,924,206 | 8/1933 | Hansen | 423/236 |
| 4,098,886 | 7/1978 | Nicklin et al. | 423/236 |
| 4,210,526 | 7/1980 | Swanson | 423/571 |

Primary Examiner—Gregory A. Heller

[57] ABSTRACT

A process for the removal of HCN from gaseous streams is described, the process being characterized by reaction of the HCN in the gaseous stream with an ammonium polysulfide solution and formation of ammonium thiocyanate in solution, precipitation and removal of sulfur from the ammonium thiocyanate-containing solution, and hydrolysis of the ammonium thiocyanate. Provision is made for recycle of hydrolysis products.

3 Claims, No Drawings

SOLUTION REMOVAL OF HCN FROM GASEOUS STREAMS, WITH PH ADJUSTMENT OF REACTED SOLUTION AND HYDROLYSIS OF THIOCYANATE FORMED

BACKGROUND OF THE INVENTION

The presence of hydrogen cyanaide (HCN) in various gaseous streams complicates removal of additional impurities, e.g., removal of $H_2S$ or $CO_2$, and poses problems insofar as product quality and pollution control requirements are concerned. In particular, gas streams derived from the gasification of coal generally have significant minor quantities of HCN which must be dealt with before the gas is utilized.

Accordingly, a practical and efficient procedure for removing impurity HCN might have gret economic importance. The invention is such a process.

In my copending application entitled Removal of HCN from Gaseous Streams, U.S. Ser. No. 556,255, filed even data herewith, there is described a process in which an HCN-containing gaseous stream is contacted with an ammonium polysulfide solution to form ammonium thiocyanate, and at least a portion of the ammonium thiocyanate-containing ammonium polysulfide solution is removed and subjected to hydrolysis conditions to produce $H_2S$, $NH_3$, and $CO_2$. If the contact zone is operated with a substantial excess of polysulfide sulfur, significant quantities of molten sulfur will be produced in the hydrolysis zone. In some instances, it may be preferred not to operate in such fashion, i.e., with a large second liquid phase in the hydrolysis zone. The invention provides a method of removing HCN from gaseous streams which eliminates the need for so doing.

SUMMARY OF THE INVENTION

The invention, therefore, relates to a process for the removal of HCN from gaseous streams containing this impurity, the process comprising contacting or scrubbing the gaseous stream with a solution containing ammonium polysulfide under conditions to convert or react with the HCN and produce a solution containing ammonium polysulfide and ammonium thiocyanate. The gaseous stream, now having a reduced HCN content, is passed out of the contact zone, for use, further treatment, or recovery. At least a portion of the solution containing ammonium polysulfide and ammonium thiocyanate is removed from the contact zone, preferably on a continuous basis. In accordance with the invention, the solution removed is contacted or mixed with a sufficient amount of a suitable pH-lowering composition, e.g., an inorganic acid. The pH of the removed solution is lowered, decomposing ammonium polysulfide and producing elemental sulfur, $H_2S$, and a remaining solution containing ammonium thiocyanate. The sulfur is removed from the remaining solution, and the remaining solution is subjected to hydrolysis conditions. The hydrolysis is carried out under appropriate conditions of temperature and pressure, and ammonia, carbon dioxide, and hydrogen sulfide are produced. These gases may be recycled and/or recovered, if desired, by known techniques. The process is preferably operated continuously.

DETAILED DESCRIPTION OF THE INVENTION

The reactions for the process may be shown, as follows:

$$2HCN + (NH_4)_2S_x \rightarrow 2NH_4SCN + HS^- + H^+ + S_{x-3}(x=3, 4 \text{ or } 5)$$
$$NH_4SCN + 2H_2O \rightarrow CO_2 + H_2S + 2NH_3$$

The particular gas streams treated according to the invention are not critical, as will be evident to those skilled in the art. Any gaseous stream containing HCN and from which it is desired to remove the HCN, and which itself does not react with the ammonium polysulfide or interfere substantially therewith may be treated according to the invention. Gaseous streams or effluents particularly suited to the invention include fuel gases produced by gasification procedures, e.g., fuel or effluent gases derived from or produced by the gasification of coal, petroleum,, shale, tar sands, etc., wherein a significant quantity of HCN is present. In such gasification processes, the gaseous effluents are often quenched with water or gaseous liquids, and gaseous streams derived from stripping the liquids may contain HCN and may also be treated by the invention. The HCN content of such streams may vary, but the invention will preferably be employed with streams having an HCN content of from about 0.002 percent to about 0.1 percent by volume. As indicated, the process of the invention is preferably continuous, i.e., make-up ammonium sulfide or polysulfide is continuously supplied to the contact zone, and a portion or "bleed" of ammonium thiocyanate solution is continuously removed from the contact zone. The volumes of make-up and bleed will depend, inter alia, on the concentration of HCN in the gaseous stream, and thus cannot be given with precision. Those skilled in the art may suitably adjust solution flows.

Suitable conditions, i.e., appropriate temperature and pressure, sufficient contact time, proper pH, and appropriate concentrations of ammonium polysulfide and water are employed to achieve the HCN conversion to ammonium thiocyanate. Temperatures in the contact zone of from about 20° C. to about 80° C. may be employed, with temperatures of from 25° C. to 60° C. being preferred. The pH of the ammonium polysulfide solutions will range from about 8 to 10, preferably 8.5 to 9.5, and concentrations of ammonium polysulfide will preferably range from 0.01 to 1, preferably 0.1 to 0.5 moles per liter. The most important variable controlling HCN removal and conversion is the amount of elemental sulfur available to maintain the polysulfide concentration. In general, the polysulfide solution will have at least a stoichiometric amount of the polysulfide sulfur with respect to the HCN, and preferably up to 3 or 4 times the stoichiometric amount. Elemental sulfur may be supplied in the contact zone to maintain this concentration. $H_2S$ and $NH_3$ in the feed gas do not interfere with HCN removal or conversion, and $NH_3$ may actually help rejuvenate the solution. The ammonium polysulfide solution may be supplied on a continuous basis to the contact zone as make-up, or steps can be taken, in some cases, to generate the ammonium polysulfide to some extent in situ. Contact times may range from 1 to 8 minutes, preferably 3 to 5 minutes. Those skilled in the art may select suitable contact or scrubbing devices to carry out the contacting or scrubbing.

As the HCN is removed from the gaseous stream by reaction with the ammonium polysulfide solution, at least a portion of the solution, now containing ammonium thiocyanate, is removed. The portion removed is contacted or mixed with a sufficient amount of a suitable pH-lowering composition to lower the pH, decompose ammonium polysulfide and precipitate sulfur, and produce $H_2S$. The $H_2S$ released may be treated or recovered, as desired. Generally, lowering of the pH to a range of 7.5 to 8 will be sufficient to precipitate the sulfur. Any suitable composition which will lower the pH the required amount may be employed. For example, acids, such as $H_2SO_4$, HCl, $HNO_3$ and acetic acid, may be employed. Suitable acidic gases, which will be taken up or react in the solution, such as HCl or $H_2S$, may be employed. Organic acids may be used, as well as other hydrogen ion-supplying compositions. Moreover, the hydrogen ion-supplying material or composition need not be pure; even dilute solutions and those containing extraneous matter may be employed, so long as the extra components in the solution do not interfere with the ammonium polysulfide decomposition or react with the ammonium thiocyanate. As indicated, the hydrogen ion-supplying composition will be supplied in an amount sufficient to decompose the ammonium polysulfide and precipitate sulfur. This amount will depend on a number of factors, and may readily be determined by those skilled in the art in the particular case.

Suitable provision is made for removal of the precipitated sulfur. For example, it may simply be filtered from the remaining solution. Since the temperature of the solution is ultimately to be raised to hydrolysis conditions, the temperature of the solution may be raised in the pH lowering or precipitation zone to a level sufficient to melt the sulfur, but not sufficiently high to cause hydrolysis of the ammonium thiocyanate. The sulfur may then be easily removed.

Upon sulfur removal, the remaining solution is forwarded to a hydrolysis zone, where the ammonium thiocyanate in the solution is hydrolyzed to produce $NH_3$, $H_2S$, and $CO_2$. Sufficient water must be present or supplied for the hydrolysis. Temperatures in the hydrolysis zone are important, and will range from about 200° C. to about 300° C. In general, pressures will range from about 20 to about 100 atmospheres. The $NH_3$, $H_2S$, and $CO_2$ produced from the hydrolysis may be recovered or treated further, as desired.

In order to demonstrate the removal of HCN from a gaseous stream, the following experiments were conducted.

PROCEDURE

A stream of nitrogen containing 1 percent by volume HCN and 0.5 percent by volume $H_2S$ was passed at atmospheric pressure at a rate of 2 volumes of gas per volume of solution per minute into a flask containing a 0.3M solution of ammonium sulfide having 1.56M sulfur suspended therein. The pH of the solution was 8.9, and the volume of gas treated was about 210 volumes of gas per volume of solution. Temperature of the system was maintained at about 80° C. Greater than 99.8 percent of the HCN was removed, and conversion to thiocyanate approached 100 percent.

In a similar manner, a series of runs was made, and the conditions and results are, as set out below:
Solution: 0.30M $(NH_4)_2S$
Gas Composition: 1% HCN in $N_2$; $H_2S$ and $NH_3$ content as indicated below
Gas Flow Rate: 290–330 cc/min.
Pressure: 1 atm
Volume of HCN/Volume of Solution ~2.1 cc/cc

| T (°C.) | Elemental Sulfur in Solution (M) | Initial Solution pH | $NH_3$ in Feed (% v) | $H_2S$ in Feed (% v) | HCN Removed (%) | HCN Converted (%) |
|---|---|---|---|---|---|---|
| 25 | 1.6 | 8.8 | 0 | 0.55 | >99.8 | 99 |
| 50 | 1.6 | 9 | 0 | 0.45 | >99.8 | 97 |
| 80 | 1.6 | 8.9 | 0 | 0.55 | >99.8 | 100 |
| 50 | 1.6 | 7 | 0 | 0.55 | >99.4 | 98 |
| 50 | 0.3 | 9 | 0 | 0.55 | >99.8 | 97 |
| 50 | 0.06 | 9 | 0 | 0.55 | >98 | 76 |
| 50 | 0.5 | 9 | 1 | 0.55 | >99.8 | 100 |
| 50 | 0.5 | 7 | 1 | 0.55 | >99.4 | 96 |

What is claimed is:

1. A process for removing hydrogen cyanide from a gaseous stream containing hydrogen cyanide comprising
   (a) contacting said gaseous stream in a contact zone with a solution containing ammonium polysulfide under conditions to convert hydrogen cyanide, and producing a solution containing ammonium polysulfide and ammonium thiocyanate, and a gas stream having reduced hydrogen cyanide content;
   (b) removing solution containing ammonium polysulfide and ammonium thiocyanate from the contact zone;
   (c) lowering the pH of the removed solution to decompose ammonium polysulfide and precipitate sulfur, and producing hydrogen sulfide, sulfur, and a remaining ammonium thiocyanate-containing solution, and removing sulfur from said remaining solution;
   (d) hydrolyzing the ammonium thiocyanate in said remaining solution and producing ammonia, hydrogen sulfide, and carbon dioxide.

2. The process of claim 1 wherein the gaseous stream comprises a stream derived from the gasification of coal.

3. The process of claims 1 or 2 wherein the amount of ammonium polysulfide solution supplied in step (a) contains at least a stiochiometric amount of polysulfide sulfur with respect to the hydrogen cyanide.

4. The process of claim 2 wherein the pH of the Ammonium polysulfide solution in step (a) is from 8.5 to 9.5 and the pH of the removed solution is lowered in step (c) to a range of from 7.5 to 8.

* * * * *